May 23, 1967    E. F. VYE    3,321,170
MAGNETIC ADJUSTABLE POLE PIECE STRIP HEATER CLAMP
Filed Sept. 21, 1965
FIG. 1
FIG. 2
FIG. 3
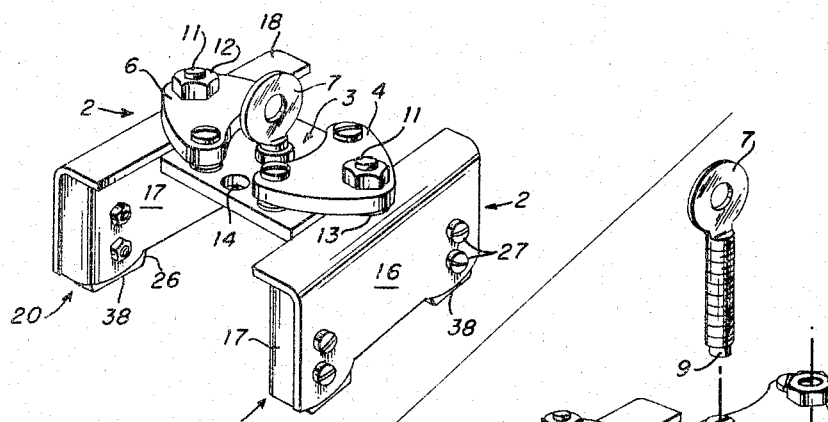
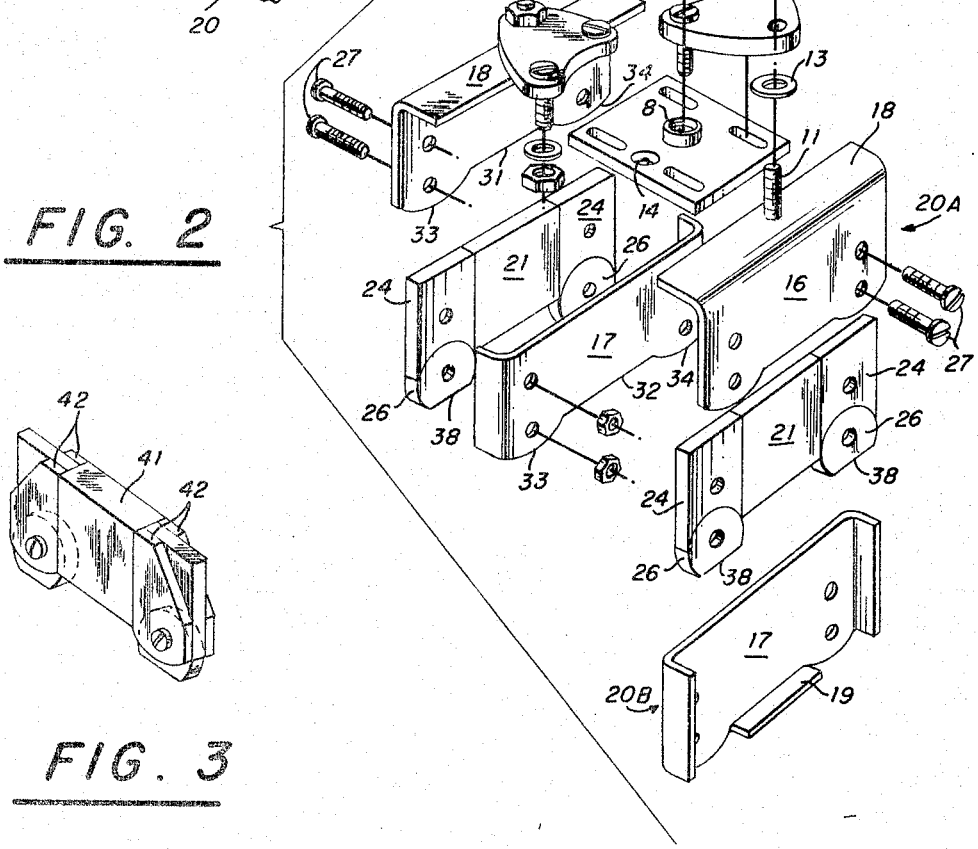
INVENTOR.
EARL F. VYE
BY
ATTORNEYS

United States Patent Office 3,321,170
Patented May 23, 1967

3,321,170
MAGNETIC ADJUSTABLE POLE PIECE STRIP HEATER CLAMP
Earl F. Vye, 437 El Cajon Drive,
San Jose, Calif. 95111
Filed Sept. 21, 1965, Ser. No. 489,087
7 Claims. (Cl. 248—361)

The invention described herein may be manufactured and used by or for the Government of the United States of America for governmental purposes without the payment of any royalties thereon or therefor.

The present invention relates to strip heaters of the type frequently used for preheating surfaces preparatory to welding or other fabrication steps, and, in particular, it features clamping mechanisms for holding the heaters in fixed positions against an underlying surface.

In a number of situations, it becomes desirable to heat a relatively large surface and, for this purpose, it is not unusual to employ what are known as strip heaters which, in brief, are long, thin plates of a thermally-conductive metal capable of being electrically heated to impart their heat to underlying surfaces against which the plates are held. Such a practice has become widely used in the fabrication and repair of submarine hulls where large hull sections must be welded together, the strips, of course, serving the purpose of providing the heat necessary for the welding.

This practice, however, is recognized as notoriously uneconomical particularly due to the laborious and expensive manner in which it has been necessary to secure the strips in fixed positions. Thus, customarily the strips have been spot-welded in place and the welding requires such preliminary steps as the erecting of appropriate scaffolding, laying out and marking spots for grinding preparatory to the welding, setting up the grinding equipment and, of course, the fabrication of the straps themselves which, in most cases are formed of stainless steel and are fitted and bent to fit a particular job following which the straps usually are thrown away or used as scrap. Also, subsequent to the spot welding of these straps, it is necessary to remove them and this operation in itself involves substantial time and effort. Further, the spot welding itself frequently has resulted in injury to the hull sections, such as the blowing of holes in the metal due to chips getting between the strips and the metal or due to the fact that paint present in repair jobs had not been completely removed.

Other procedures for securing the strip heaters have included the steps of stud welding cleats for holding the heaters. In this practice, nuts or the like are threaded into the studs to hold the heaters in place. Obviously, the economics of such a method also are open to question.

More recently, however, the difficulties experienced with these conventional procedures have been relieved to a very substantial extent by employing special magnetic clamps to hold the strip heaters in place. As described in U.S. Patent 3,169,184, issued Feb. 9, 1965, to Earl F. Vye, substantial economy of time and effort is achieved since, in using the magnetic clamps, the strip heating apparatus does not have to be physically secured to the object being heated. Thus, the strips can be used repeatedly on different jobs without the necessity of preparing separate strips for each operation and also without the wasteful requirement of scraping the strips after each use.

Generally considered, the clamps employed for this procedure employ a U-shaped casing in which a section of hard magnetic material, such as Alnico V is mounted in the web of the U and sections of soft magnetic material are mounted in each of the legs. The legs are spaced sufficiently to straddle a strip heater, the heater itself being securely clamped against the surface of the object to be heated by means of a so-called load arm which extends downwardly through the web of the U into engagement with the heater.

Although the special clamping mechanisms which have been developed, such as those illustrated and described in the referenced U.S. patent, have proven effective, some difficulty has been experienced when the radius of curvature of the object along which the strip heater extends is such that the soft magnetic pole pieces of the magnetic circuit do not flushly engage the ferrous surface of the object. Obviously, when this condition exists, the holding power of the magnets is substantially reduced.

It is therefore a primary object of the present invention to provide a magnetic clamping apparatus capable of assuring maximum magnetic advantage when used on curved surfaces.

A more specific object is to provide such a magnetic clamping apparatus with adjustable pole pieces capable of rotatably adjusting to the curved surfaces.

A further object is to provide a clamping apparatus having such adjustable pole pieces, the apparatus being so constructed that it can be readily modified to provide greater or lesser magnetic holding forces dependent upon the requirements of the job at hand.

Yet another object is to provide clamping apparatus in accordance with the foregoing objects, the apparatus being of a well balanced construction so as to be readily and economically fabricated on a mass production basis.

Still another object is to provide an improved, adjustable clamping apparatus in which the spacing of its strip heater straddling leg portions can be varied to suit differing strip heater widths.

Other objects and their attendant advantages will become more readily apparent in the ensuing detailed description.

Broadly considered, the objects of the present invention are achieved principally by employing a pair of pole pieces rather than the single pole piece utilized in U.S. Patent 3,169,184. The pair of pole pieces are fitted together with a ball and socket fitting so that one of the pole pieces, which will be referred to as the outer adjustable pole piece, can rotate or pivot to conform its outer contact surface with the curvature of the surface to be heated.

Most suitably, the present clamp employs the familiar U-shaped construction in which the web of the U mounts the previously described load arm which physically engages the heater to hold it against the underlying surface. The legs of the U also are spaced sufficiently to straddle the heater and the magnetic components are closely fitted into these leg portions. Each leg includes a frame or casing for the magnetic components, the casing being carried by the web and the arrangement, most suitably, being such that the spacing of the legs can be varied to suit varying heater widths. Also, in the preferred form, the frame is rectilinear in shape and is formed with side walls the longitudinal extent of which run in the longitudinal direction of the strip heater. Maximum advantage is achieved if two pairs of ball and socket fitted pole pieces are used, each pair being mounted at opposite ends of the rectilinear frame and the adjustable outer pole piece of each pair extending through an opening in the bottom of the frame. Further, the projection of each of the adjustable pole pieces through its opening should be sufficient so that the only contact of the clamp with the underlying surface is by means of these adjustable pole pieces.

Another notable feature of the present invention is the particular construction of the legs which permits modifications which may substantially increase the magnetic holding force of the clamp. Thus, each of the leg frames preferably is formed of two halves which fit together to provide the necessary enclosure, the halves then being bolted or otherwise secured one to the other. In a manner which will become more apparent in later description, if it is desired to increase the magnetic holding force, a bigger section of the Alnico V may be employed and the width of the pole pieces also increased by utilizing additional sheets of soft magnetic material on each heater or both sides of each pair of ball and socket fitted pole pieces. The fact that the frame is formed of separable halves permits the frame to be expanded to adjust to the increased width of the foregoing members. Most suitably, the bolts or the like which secure together the two halves also extend through the pairs of pole pieces so as to maintain the position of these pole pieces. If the additional sheets of soft magnetic material are used, the bolts or screws, of course, extend through these sheets.

The invention is illustrated in the accompanying drawings of which:

FIG. 1 is a perspective illustrating an assembled clamping apparatus;

FIG. 2 is an exploded view showing the various parts of the apparatus in perspective; and FIG. 3 is a modification of the magnetic circuit in which only the magnetic components are shown.

Referring now to the drawings, it will be noted that the clamping apparatus is a U-shaped structure having leg portions 1 and 2 and a plate-like web 3 coupled to the legs by supporting members 4 and 6. The inner ends of the leg-supporting members are secured to plate 3 by a nut and bolt arrangement and, as may be noted in FIG. 2, the plate openings through which the bolt extends are slotted to permit the spacing of the legs to be varied as desired. The plate also mounts a threaded load arm 7 and, since the plate, as well as the other structural members to be described, is formed of aluminum or other non-ferrous material, it is preferred to extend the load arm through a stainless steel threaded insert 8, best seen in FIG. 2. As has already been described, the load arm is capable of being extended into engagement with the underlying strip heater and it is most desirable to provide the strip heater with a load arm receiving opening and also to provide the load arm with a reduced diameter, unthreaded portion 9 capable of fitting into the opening to securely hold the heater in a fixed position.

Legs 1 and 2 are pivotally carried by leg-supporting members 4 and 6 and, for this purpose, a pivotal bolt 11 projects upwardly through each leg and also through its leg-supporting member, the upwardly projecting portion of the bolt mounting a nut 12. A spacer member 13 is disposed between each leg and its supporting member and, to permit the legs to pivot, a slight clearance being allowed between the spacer and its adjacent members, i.e., the adjacent members are not secured tightly against the spacer.

It may also be noted that plate 3 is provided with another opening 14 adapted to receive a chain which may be used to couple the clamping apparatus into an assembly of chained together clamps. The advantages of such an assembly are described in U.S. Patent 3,169,184.

Other features of the invention reside principally in the leg structure and the arrangement of the magnetic components which they carry. First, it will be seen that each leg is generally rectilinear in shape and, for descriptive purposes, may be considered as having side walls 16 and 17 as well as a top wall 18 and a partial bottom wall 19. These walls being provided by a two-part construction which when assembled form frames 20 which house the magnetic components.

Within each frame 20 are disposed the magnetic components which include a section 21 of a hard magnetic material such as Alnico V and two pairs of pole pieces, each of the pairs including an inner pole piece 24 and an outer pole piece 26 formed of a soft magnetic material such as iron or mild steel.

As is apparent in FIG. 2, each of the leg frames 20 is formed of two structural sections 20A and 20V which are fitted together and secured by stainless screws 27 which extend through openings provided in the side walls of the sections and also through the pole pieces mounted interiorly of the sections. The screws are secured by stainless nuts so as to permit ready separation of the two sections either for replacement purposes, recharging or, in a manner which will be described later, the modification of the magnetic circuitry to permit increased magnetic holding force.

Considering frame 20 in even greater detail, it will be noted section 20A provides top wall 18 of the frame, while section 20B provides the partial bottom wall 19. Also, top wall 18 is considerably wider than would be required to cover the top of the assembled frame, this fact being best shown in FIG. 1. Thus, if it is desired to expand the width of the frame to provide an expanded housing for heavier and thicker magnetic components, it simply is necessary to utilize a longer length of the connecting screws 27. The lower or outer portions of sections 20A and 20B each are formed with recessed extents 31 and 32 on both sides of which are arcuate extensions 33 and 34. Bottom wall 19 of the frame is formed by an inwardly extending right angle flange portion. Section 20B provides flanged end walls 36 and 37. When the two sections are assembled, the frame will have, as already stated, a rectilinear form capable of completely enclosing the magnetic components which will be described except that, due to the partial extent of bottom wall 19, the bottom or outer end of the frame is provided with a pair of openings one at each of its ends.

A principal feature of the invention is the manner in which each pair of pole pieces 24 and 26 interengage, as well as the manner in which the Alnico V section engages the pairs of pole pieces to complete the magnetic circuit. In particular, it is to be noted that each of the pair of pole pieces engage one another in a ball and socket fitting which permits outer pole pieces 26 to rotate about the axis of stainles screws 27. The rotation, in turn, permits the pole pieces to adjustably conform to curvatures on which they rest.

Considering this arrangement in greater detail, it will be seen that inner pole pieces 24 are in the form of rectilinear plates except that the lower end of each pole piece is provided with an arcuate recess into which the outer pole pieces fit. Outer pole pieces 26, each are plate-like pieces formed of a truncated circular shape the arcuate edge portions of which are received in the recesses of its companion member. Obviously, the circular shapes are truncated to provide a flat surface 38 assuring a maximum surface area contact with the ferrous surface of the object to be heated by the strip heaters. At this point, it may be noted that one purpose of forming the bottom end of the frame with recesses 31 and 32 is to assure that this whole contact between the clamping apparatus and the surface which it engages, is by the flat surfaces of pole pieces 26.

The hard magnetic material section 21 is, as shown, disposed between the pairs of pole pieces and is held in a fixed position by a flush engagement with the side edges of inner pole pieces 24 as well as a fitted engagement with top and bottom frame walls 18 and 19. Also, as would be expected, side walls 16 and 17 of the frame are brought into tight engagement with the sides of section 21. Consequently, when the frame is assembled, screws 27 maintain the positions of the pole pieces, while the pole pieces and the walls of the frame maintain the fixed position of the hard magnetic material section 21. Outer pole pieces 26, of course, project outwardly through the openings in the bottom end of the frame to engage the underlying surface. In installing the magnetic components, it is important to provide identical parallel polarity to the extent that both of the north poles are on the same end of the clamp and both south poles on its opposite ends. Since it is preferred to leave the Alnico V sections uncharged until after assembly is completed, it may facilitate assembly to identify residual polarity by using a directional compass and then employing paint to identify the north poles of the sections.

The present clamping apparatus is particularly advantageous when used on surfaces which have a radius of curvature aligned with the strip heater which the clamping apparatus straddles. Outer pole pieces 26 then are capable of adjusting themselves through about a 75° sweep so as to permit maximum pole shoe contact. Thus, the construction assures the greatest magnetic advantage and provides adequate strength for holding the strip securely to an underlying surface. However, as has been described, it is by the use of load arm 7 which physically engages the strip heaters that the strips are held to the surface.

FIG. 3 illustrates a modified arrangement and, as previously stated, it shows only the magnetic components in the arrangement which normally they would have within their frames 20. The purpose of the modification is to permit increased magnetic force when operating conditions so require. Principally, the increased magnetic force is obtained by employing a thicker section of Alnico V, this thicker section being identified by numeral 41. Also, increased flux is obtained by using additional sheets 42 of soft magnetic material, these sheets being disposed one on each side of each of the pairs of pole pieces previously described with reference to FIG. 2. As will be appreciated, the ability of the present clamping apparatus to accommodate the increased thickness of section 41 and sheets 42 is due to the expandable nature of its structural parts. In other words, when the FIG. 3 modification is desired, it only is necessary to employ a longer length of stainless screws 27 so as to permit greater spacing between the side walls of sections 20A and 20B. Screws 27 then extend not only through the pairs of pole pieces 22 and 23 but also through sheets 42 positioned at each side of each of the pole pieces. It will be appreciated that, by employing expandable structure of the frame, a single clamp can be readily modified either to increase the force or, for economic purposes to minimize the size of its magnetic components.

Obviously, many modifications and variations of the present invention are possible in the light of the above teachings. It is therefore to be understood that within the scope of the appended claims the invention may be practiced otherwise than as specifically described.

I claim:
1. Clamping apparatus for holding a strip heater on a ferrous metal surface, comprising;
a horizontally-disposed plate,
spaced leg members carried by and extending outwardly of said plate,
a load arm adjustably carried by said plate and extending outwardly between said spaced leg member,
said leg members each including:
a box-like frame formed of non-ferrous material and provided at its outer end with an opening,
a pair of soft magnetic material pole pieces, and
a section of hard magnetic material,
one of said pole pieces having a flat outer surface projecting outwardly through said frame opening and also having its inner end contacting said other pole piece in a ball and socket fitting,
said section of hard magnetic material flushly engaging said other pole piece,
said leg members being spaced for straddling said strip heater and securely holding the apparatus against said ferrous metal surface and said load arm being adjustably extendable into clamping engagement with said strip heater, and
said ball and socket fitting permitting said one pole piece to rotatably conform to curvatures of said metal surface.

2. The clamping apparatus of claim 1 further including a pair of leg-supporting means each secured to opposite sides of said horizontal plate and pivotally supporting said leg members for rotational movement about vertical axes.

3. The clamping apparatus of claim 2 wherein said plate is provided with means for securing said leg-supporting means in a plurality of positions whereby the spacing of the legs is adjustable.

4. The clamping apparatus of claim 1 further including a second pair of said ball and socket fitted pole pieces,
said box-like frames each being rectilinear in form and being provided at its outer end with a pair of openings one at each longitudinal end portion of said outer end,
said two pairs of pole pieces of each frame being closely fitted between the longitudinal side walls of said rectilinear frame at opposite ends of said walls, and said sections of hard magnetic material of each frame extending between and flushly engaging both of said pairs,
the outer one of the pole pieces of each of said pairs having an elongate flat outer surface extending in the direction of said frame side walls and also projecting into its proximate frame opening.

5. The clamping apparatus of claim 4 wherein a pivotal shaft is mounted transversely between said side walls of each frame, the shaft extending through said outer one of each of the ball and socket fitted pole pieces for securing the disposition of said pole pieces while permitting its rotational movement.

6. The clamping apparatus of claim 5 further including shaft means extending between the side walls of each frame for securing the disposition of said others of said ball and socket fitted pole pieces.

7. The apparatus of claim 6 wherein said side walls of each frame are separable and are secured in assembled disposition by said pivotal shafts and said shaft means.

References Cited by the Examiner
UNITED STATES PATENTS
3,047,704  7/1962  Van Noy et al. ____ 248—361 X

References Cited by the Applicant
UNITED STATES PATENTS
3,169,184  2/1965  Vye.

CHANCELLOR E. HARRIS, *Primary Examiner.*
F. DOMOTOR, *Assistant Examiner.*